United States Patent [19]
Schluter

[11] Patent Number: 5,564,857
[45] Date of Patent: *Oct. 15, 1996

[54] SLUTTED DRAIN

[75] Inventor: James C. Schluter, Franklin, Ohio

[73] Assignee: Contech Construction Products Inc., Middletown, Ohio

[*] Notice: The term of this patent shall not extend beyond the expiration date of Pat. No. 5,380,121.

[21] Appl. No.: 369,709

[22] Filed: Jan. 6, 1995

Related U.S. Application Data

[63] Continuation-in-part of Ser. No. 43,572, Apr. 7, 1993, Pat. No. 5,380,121.

[51] Int. Cl.⁶ .................................................. E02B 11/00
[52] U.S. Cl. .................. 405/36; 404/14; 210/164
[58] Field of Search .................. 405/36, 43, 49, 405/126, 118; 404/2–5, 14; 210/163, 164

[56] References Cited

U.S. PATENT DOCUMENTS

| | | |
|---|---|---|
| 3,446,025 | 5/1969 | Koch . |
| 3,815,213 | 6/1974 | Evans et al. . |
| 4,365,911 | 12/1982 | Rossberg ..................... 404/2 |
| 4,490,067 | 12/1984 | Dahowski . |
| 4,640,643 | 2/1987 | Williams . |
| 4,787,773 | 11/1988 | Kehler . |
| 4,844,655 | 7/1989 | Aleshire . |
| 4,878,782 | 11/1989 | Beattie et al. . |
| 4,940,359 | 7/1990 | Van Duyn et al. . |
| 4,993,877 | 2/1991 | Beamer . |
| 4,993,878 | 2/1991 | Beamer . |
| 5,000,621 | 3/1991 | Beamer . |
| 5,026,202 | 6/1991 | Thomann . |
| 5,066,165 | 11/1991 | Wofford et al. . |
| 5,106,231 | 4/1992 | Thomann . |
| 5,380,121 | 1/1995 | Schluter .......................... 404/14 |

FOREIGN PATENT DOCUMENTS

| | | |
|---|---|---|
| 2356771 | 1/1978 | France . |
| 2161190 | 1/1986 | United Kingdom . |
| 2192655 | 1/1988 | United Kingdom . |

*Primary Examiner*—Tamara L. Graysay
*Assistant Examiner*—Frederick L. Lagman
*Attorney, Agent, or Firm*—Wood, Herron & Evans, P.L.L.

[57] ABSTRACT

A slotted drain includes a drain pipe having an elongated narrow slot extending lengthwise along its top surface. A lower grate is rigidly secured to the elongated slot and is formed by a pair of bearing plates connected to one another by a series of spacer plates and connected to the edges of the elongated slot. The lower grate is connected to an upper grate initially in an adjustable manner such that the height and angle of the upper grate may be adjusted with respect to the lower grate and the drain pipe. The height of the upper grate with respect to the drain pipe is dependent upon the intended depth at which the drain pipe will be situated and the angle of the upper grate may, for example, correspond to the drainage slope at which the drain pipe will be set. Once the upper grate has been adjusted to the desired height and angle, the upper grate is rigidly secured to the lower grate. In a first preferred embodiment the lower grate telescopically receives the upper grate and in a second preferred embodiment the upper and lower grates are connected to each other by a pair of intermediate bearing plates.

6 Claims, 3 Drawing Sheets

SLUTTED DRAIN

This is a continuation-in-part application of U.S. Ser. No. 08/043,572, now U.S. Pat. No. 5,380,121.

BACKGROUND OF THE INVENTION

This invention generally relates to slotted drains and more particularly to slotted drains having upper and lower grates which are initially variable in both height and slope and which may then be rigidly fixed with respect to each other at a predetermined height and slope with respect to an attached drain pipe.

Slotted drains have been widely used in the past for draining surface water from roadways, parking lots and airport runways, for example. The open slot at the top of the drain is placed level with or immediately below the surface to be drained so that surface water will flow directly through the slot and into the drain pipe installed below the ground. Typical open top slotted drains have comprised structures such as those shown in U.S. Pat. No. 3,815,213 to Evans et al. which was issued on Jun. 11, 1974.

The drains disclosed by Evans et al. generally include lower pipe sections which have been longitudinally split along an upper side to form a narrow, longitudinal slot in which a grate is secured to extend along the length of the pipe. The grate is formed by a pair of spaced bearing plates rigidly secured on either side of the narrow slot. Various arrangements of spacer members extend between the two grate members and are welded to the inside surfaces of each bearing plate. The disclosed spacer members comprise either solid cross bars which extend perpendicularly to the axis of the pipe or a sinusoidal plate member disposed between the two bearing plates. Other types of spacer members which have been used in the past include flat, vertically extending plates disposed between and welded to the inside surfaces of the bearing plates.

Methods have also been developed by which to properly set the elevation and slope of the drain within a trench. Two examples of such methods are disclosed in U.S. Pat. No. 4,844,655 to Aleshire and U.S. Pat. No. 4,878,782 to Beattie et al. Both Aleshire and Beattie et al. utilize posts or spikes to support the drain at the proper elevation within the trench while concrete is poured into the trench surrounding the drain. Typical methods of raising the height of a drain such that it may be placed within deeper trenches have included stacking sections of the drain itself in the case of channel drains, or stacking separate grates on top of one another in the case of slotted drain pipes. Examples of stacked drainage channel systems are found in U.S. Pat. No. 4,640,643 to Williams, U.S. Pat. Nos. 5,026,202 and 5,106,231 to Thomann.

Past drainage system designs have also included means for sloping the drain while keeping the upper edges thereof level with the surface of the drainage area. These designs have included trench drains having built-in drainage slopes such as those disclosed in U.S. Pat. No. 4,640,643 to Williams and U.S. Pat. No. 5,066,165 to Wofford et al.

One known method of providing a slotted drain pipe with a grate which is sloped with respect to the drain pipe involves sloping the grate with respect to the axis of the drain pipe such that one end of the grate extends considerably below the inside surface of the drain pipe. This method, however, either necessitates an additional manufacturing step thus adding to the cost of the drain or will increase the chances of debris clogging the pipe. That is, the grate must be cut along the angle of the slope so as not to extend considerably into the drain pipe or, if left to extend into the pipe, it serves as a potential obstruction which may cause clogging.

Past drainage systems have thus failed to provide for easy adjustment of both the height and slope of the drain. Accordingly, there remains a need for a slotted drain having grates which are adjustably attachable to one another so as to enable both vertical and angular adjustment of one with respect to the other and which may be rigidly secured to one another at a particular slope and height to meet the needs of a particular drainage site.

SUMMARY OF THE INVENTION

The present invention therefore generally comprises a slotted drain including a lower drain pipe and a grate assembly supported primarily by the pipe and connected along a top surface thereof to allow surface drainage to run through the grate assembly and into the pipe. The grate assembly includes upper and lower grate means and further includes means for adjustably connecting the upper and lower grate means to one another such that the upper grate means may be vertically and angularly adjusted with respect to the lower grate means and the longitudinal axis of the drain pipe. Thus, a slotted drain of the present invention may be used at a variety of depths and angles depending on the height and angle adjustments made to the grate assembly before or during final installation of the drain.

In the preferred embodiments of the invention a slotted drain is provided and generally includes a lower drain pipe which has been split along the length of its upper surface to form a narrow, elongated slot. A lower grate is rigidly secured within the slot and takes the form of two lower bearing plates secured to the edges of the slot to extend parallel to the longitudinal axis of the drain pipe. A plurality of spacer members are preferably disposed between the lower bearing plates and are rigidly secured to inner surfaces of the lower bearing plates. An upper grate including two upper bearing plates is further provided and preferably similarly includes spacer members welded or otherwise secured at spaced locations between the upper bearing plates. The upper grate is rigidly secured at a predetermined height and slope with respect to the lower grate and the drain pipe according to the drainage needs of a particular job site. Although the artisan of ordinary skill will readily recognize other methods of attaching the upper grate to the lower grate such that the height and slope may be set at specific values, two preferred embodiments are presently contemplated and described herein.

In a first embodiment the upper grate is telescopically received within the lower grate and is adjusted to a specific height and slope with respect to the lower grate. When the proper height and slope of the upper grate is set, the upper and lower grates are rigidly secured together by, for example, a series of filet welds, a series of plug welds through pre-punched holes, or other suitable fastening means along the top edges of the lower grate. The lower grate preferably includes a series of spacer members which take the form of flat plates secured between the bearing plates of the lower grate at a lower portion thereof. An upper portion of the lower grate is left free of any spacer members to create a space such that the upper grate may be adjustably received therein for varying the height and slope of the upper grate with respect to the lower grate and the longitudinal axis of the drain pipe.

A second embodiment of the invention utilizes a pair of intermediate bearing plates secured between, the respective upper and lower bearing plates. As in the first embodiment, the lower grate is welded or otherwise rigidly secured within the narrow slot created in the top surface of the drain pipe. The upper and lower grates similarly include spacer plates secured at longitudinally spaced locations between the bearing plates of each grate. The two intermediate bearing plates are rigidly fastened to the outside surfaces of the respective upper and lower bearing plates. The intermediate bearing plates are thus disposed in planes which are parallel to the planes of the upper and lower bearing plates. Before the upper grate is secured to the intermediate bearing plates, its height and slope with respect to the longitudinal axis of the drain pipe is adjusted according to the needs of the drainage site.

Accordingly, certain advantages of the preferred embodiments of the present invention are apparent. First, the method and apparatus of the invention allow slotted drain pipes to be easily installed with the drain pipe sloped for faster drainage while the top edges of the grate are positioned parallel to the surface of the drain area. At the same time that the grate communicating with the drain area is angled or sloped with respect to the drain pipe during assembly thereof, the grate may be easily adjusted in height with respect to the pipe. This allows the same slotted drain pipe to be used at a variety of depths and slopes within the ground simply by adjusting the height and slope of the top grate. Conversely, the need to stock numerous sizes of grates or to cut grates to specific sizes to accommodate the needs of particular drainage sites has been significantly reduced thereby reducing manufacturing steps and costs associated with such drains.

Other advantages of the invention will be readily apparent to those of ordinary skill in the art from the following detailed description taken in conjunction with the accompanying drawings.

DETAILED DESCRIPTION OF THE PREFERRED EMBODIMENTS

Figure 1:
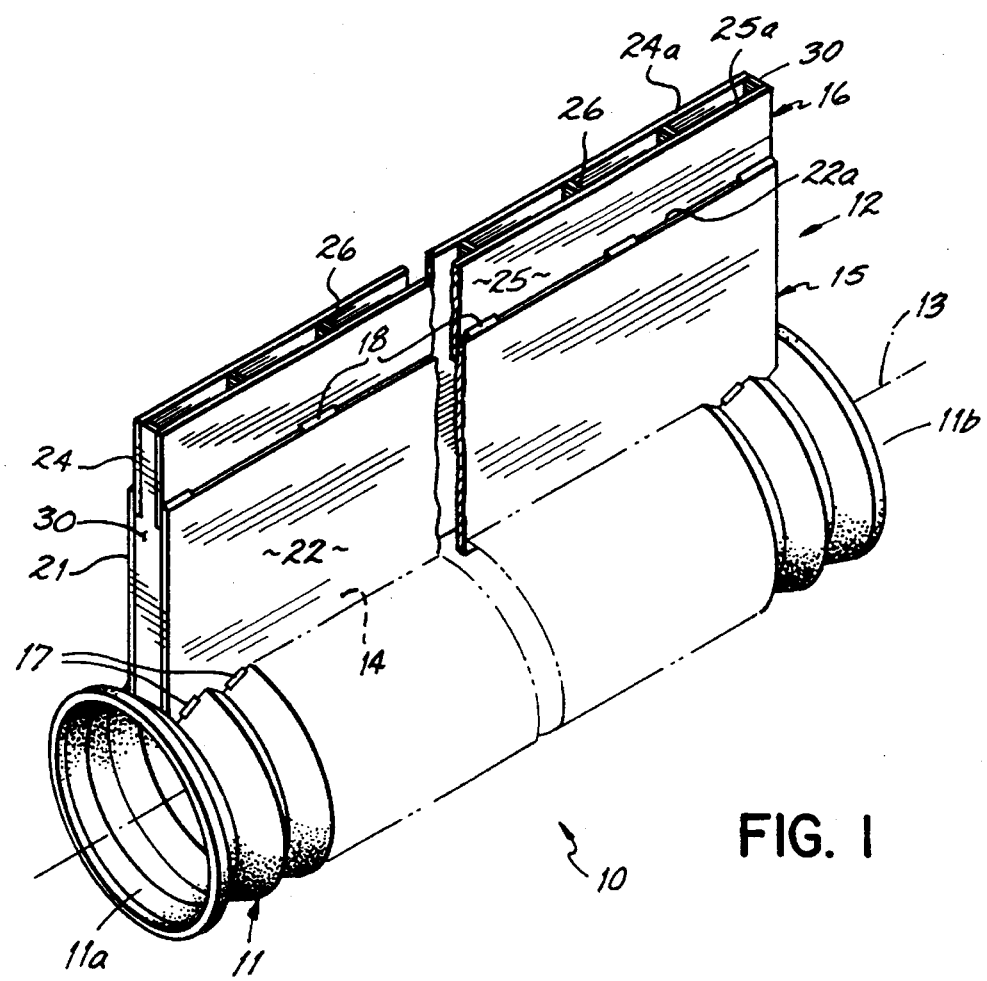
FIG. 1 is a perspective view of a first embodiment of a slotted drain of the present invention.

As shown in FIG. 1, the slotted drain 10 of a first embodiment of the present invention includes a lower drain pipe 11 and an upper adjustable grate assembly 12. Although the drain pipe may take numerous forms, such as smooth wall pipe, annularly corrugated pipe and helically corrugated pipe, the preferred form is the helically corrugated variety of pipe. The drain pipe 11 has a longitudinal axis 13 and an elongated slot 14 extending lengthwise along its top surface. The grate assembly 12 includes a lower grate 15 which telescopically receives an upper grate 16. The lower grate 15 is rigidly secured within the elongated slot 14 of the pipe 11 by, for example, a series of filet welds 17 disposed along the juncture of the slot 14 and the lower grate 15. Preferably, the lower grate 15 is secured to the slot 14 such that it extends generally parallel to the axis 13 of the pipe 11. However, the lower grate 15 may also be sloped with respect to the drain pipe 11 by allowing one end thereof to extend through the slot 14 a greater amount than the other end to thereby create an additional degree of slope adjustment. As may be appreciated from FIG. 1, the upper grate 16 may be vertically and angularly adjusted within the lower grate 15 and then secured thereto by, for example, a series of filet welds 18 disposed along the top side edges of the lower grate 15.

Figure 4:
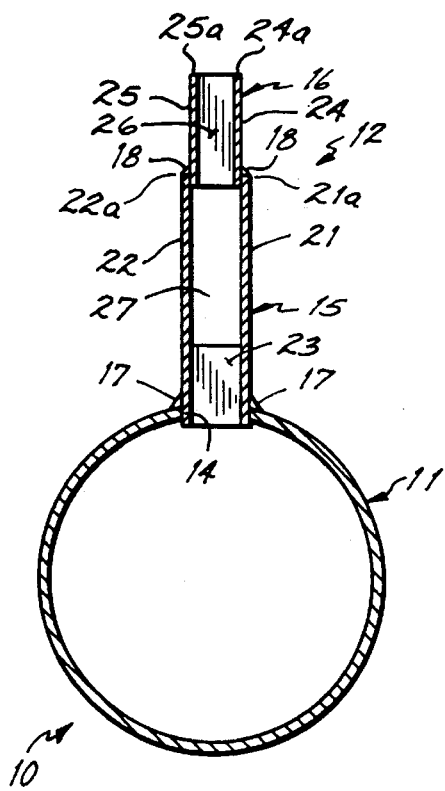
FIG. 4 is a cross sectional view of FIG. 2 taken along line 4—4.

As shown in FIG. 4, the lower grate 15 is made up of a pair of lower bearing plates 21, 22 which, as mentioned above, have been rigidly mounted within the elongated slot 14 by a series of filet welds 17 which connect the outside surfaces of each bearing plate 21, 22 to the outside surface of the drain pipe 11 along the slot 14. The lower bearing plates 21, 22 are also connected to one another by a series of spacer plates 23 which, for example, may extend generally perpendicular to the bearing plates 21, 22 as well as the longitudinal axis 13 of the drain pipe 11. Each spacer plate 23 is rigidly secured to the inside surface of each lower bearing plate 21, 22 and serve to both support the bearing plates 21, 22 and prevent large obstructions from entering the drain pipe 11 via the lower grate 15.

As further shown in FIGS. 1 and 4, the upper grate 16 comprises a pair of upper bearing plates 24, 25 connected by a series of spacer plates 26. As with the spacer plates 23 contained in the lower grate 15, the spacer plates 26 are rigidly secured between the inside surfaces of the upper bearing plates 24, 25 and serve to both connect and support the upper bearing plates 24, 25 and prevent large obstructions and debris from entering the upper grate 16 and, in turn, from entering the drain pipe 11. As further shown in FIG. 4, the upper grate 16 has a width less than the width of the lower grate 15 and thus may be telescopically received within the lower grate 15. A space 27 is provided above the spacer plates 26 of the lower grate 15 so as to provide room for the upper grate 16 to be adjusted both vertically and angularly with respect to both the lower grate 15 and the longitudinal axis 13 of the drain pipe 11. As illustrated in FIG. 1, an end plate 30 is provided at each end of the grate assembly 12 so as to prevent fill material 31 from entering the grate assembly 12 during the construction of the drain.

Figure 2:
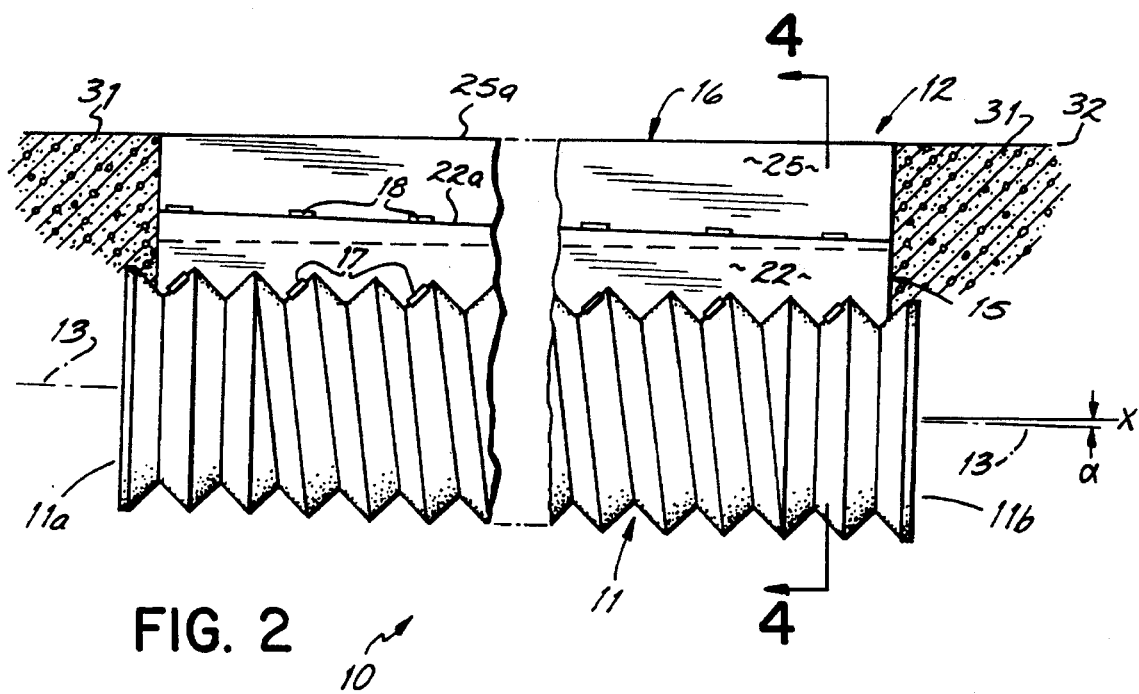
FIG. 2 is a side elevational view of the drain of FIG. 1 shown in place under the surface of the drainage area.

Referring now to FIG. 2 which shows the slotted drain 10 in place under a drain area surface 32, the upper grate 16 has been adjusted both vertically and angularly with respect to the longitudinal axis 13 of the drain pipe 11 according to a method of the invention. That is, the upper grate 15 has been adjusted such that the top edges 24a, 25a of the upper bearing plates 24, 25 are set at an angle a with respect to the longitudinal axis 13 of the drain pipe 11. This angle may, for example, correspond to the drainage slope of the drain pipe 11 which causes drainage to run from the inlet end 1 1 a to the outlet end 11 b of the drain pipe 11. Thus, the top edges 24a, 25a of the upper bearing plates 24, 25 may be placed level with the surface 32 of the drain area while the drain pipe 11 is placed within the ground and surrounded by fill material 31 such to lie at the drainage slope angle α. Of course, if the surface 32 of the drain area is sloped, i.e., if it is not parallel to the horizontal axis "x", then the upper grate 16 may be adjusted and rigidly fixed to the lower grate 15 such that the upper edges 24a, 25a of the upper bearing plates 24, 25 are level with or parallel to the surface 32 of the drain area.

Figure 3:
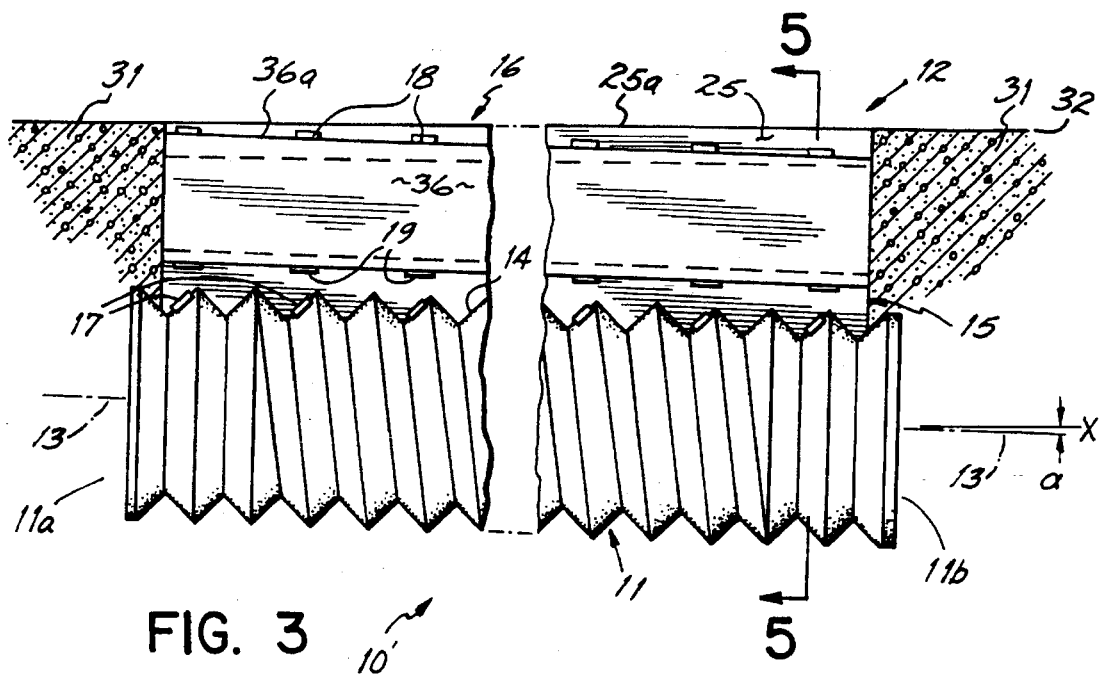
FIG. 3 is a side elevational view of a second embodiment of a slotted drain of the present invention shown in place under the surface of the drainage area.
Figure 5:
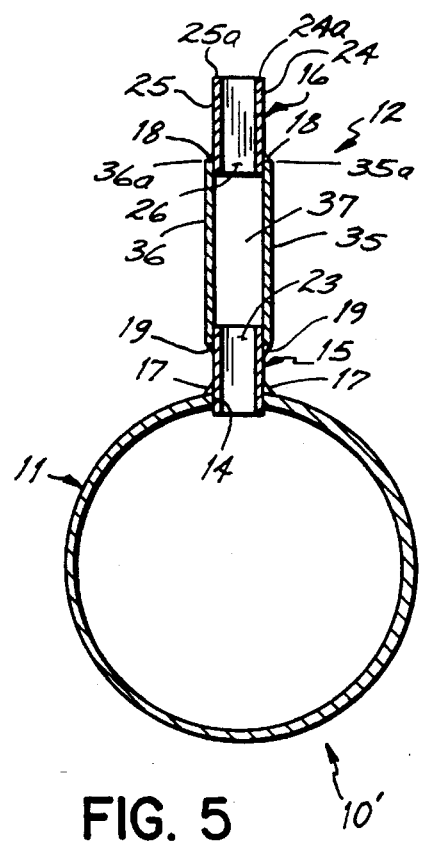
FIG. 5 is a cross sectional view of FIG. 3 taken along line 5—5.

A second embodiment of the invention is shown in FIGS. 3 and 5 wherein like reference numerals refer to like elements of the first and second embodiments of the invention. Here, the slotted drain 10' comprises a lower drain pipe 11 and an upper grate assembly 12. The lower drain pipe 11 has a longitudinal axis 13 and an elongated slot 14 extending lengthwise along its top surface. The grate assembly 12 is rigidly affixed to the slot 14 and extends upwardly therefrom. The grate assembly 12 includes a lower grate which is preferably inserted into the slot 14 and welded thereto by a plurality of filet welds 17. The grate assembly 12 further includes an adjustable upper grate 16.

As shown best in FIG. 5, the lower grate 15 and upper grate 16 are connected to one another by a pair of intermediate bearing plates 35, 36. As in the first embodiment of the invention, the lower grate 15 is comprised of a pair of lower bearing plates 21, 22 connected by a series of spacer plates 23. Likewise, the upper grate 16 is comprised of a pair of upper bearing plates 24, 25 connected by a series of spacer plates 26. Unlike the first embodiment, however, the lower grate 15 and upper grate 16 are formed of equal widths. For example, each grate 15, 16 may have a standard width of 1¾". The upper bearing plates 24, 25 are rigidly secured to the intermediate bearing plates 35, 36 by a series of filet welds 18 and the lower bearing plates 21, 22 are rigidly secured to the lower end of each intermediate bearing plate 35, 36 by, for example, a second series of filet welds 19. According to this design, the lower grate 15 and upper grate 16 are connected to one another by the intermediate bearing plates 35, 36 to form a space 37 therebetween and allow both vertical and angular adjustment of the upper grate 16 with respect to the lower grate 15 within that space 37.

In manufacturing the adjustable slotted drain 10' of FIGS. 3 and 5, the lower grate 15 is first rigidly secured by filet welds 17 to the elongated slot 14 of the drain pipe 11. The lower grate 15 is preferably secured such that the top edges 21a, 22a of the lower bearing plates 21, 22 are generally parallel to the longitudinal axis 13 of the drain pipe 11. When the lower grate 15 is rigidly fixed within the slot 14, the two intermediate bearing plates 35, 36 are welded to the outside surfaces of the respective lower bearing plates 21, 22 such that the top edges 35a, 36a of the intermediate bearing plates 35, 36 are also generally parallel to the longitudinal axis 13 of the drain pipe 11.

Referring specifically now to FIG. 3, the upper grate 16 is then adjusted both vertically and angularly with respect to the longitudinal axis 13 of the drain pipe 11. Through this adjustment, the upper grate 16 is positioned between the intermediate bearing plates 35, 36 such that its top edges 24a, 25a are set at an angle α to the longitudinal axis 13 of the drain pipe 11. As with the first embodiment of the invention, this angle may, for example, correspond to the drainage slope of the drain pipe 11 which causes drainage to run from the inlet end 11a to the outlet end 11b of the drain pipe 11. Thus, the top edges 24a, 25a of the upper bearing plates 24, 25 may be placed level with the surface 32 of the drain area while the drain pipe 11 is placed within the ground and surrounded by fill material 31 to lie at a drainage slope angle α with respect to the horizontal axis "x". If the surface 32 of the drain area is sloped, then the upper grate 16 may be adjusted and rigidly fixed to the intermediate bearing plates 35, 36 such that the upper edges 24a, 25a of the upper bearing plates 24, 25 are level with or parallel to the drain area surface 32.

As one alternative manner of positioning the top edges 24a, 25a of the upper bearing plates 24, 25 at an angle α with respect to the surface 32 of the drain area, the intermediate bearing plates 35, 36 may first be secured to the upper grate 16 by filet welds 18, and then the bearing plates 35, 36 may be placed on top of the already fixed lower grate 15 and adjusted both vertically and angularly with respect thereto. This adjustment will cause vertical and angular adjustment of the top edges 24a, 25a of the upper bearing plates 24, 25 with respect to the longitudinal axis 13 of the drain pipe 11. The height and angle of the upper grate 16 will correspond to the depth and slope, respectively, at which the drain pipe 11 will be set. Once the vertical and angular adjustment of the upper grate 16 has been made to correspond to the depth and drainage slope angle a of the drain pipe 11, the lower end of each intermediate bearing plate 35, 36 may be rigidly secured to the respective outside surfaces of the lower bearing plates 21, 22.

FIGS. 6 and 7 again illustrate a slotted drain 10" including multi-piece grate structure substantially as shown in FIGS. 3 and 5, the structure of which is described above, but showing a special case in which upper edges 24a, 25a of upper grate 16 are oriented at least substantially parallel to axis 13 of drain pipe 11. Like reference numerals as between these four figures represent like structure as previously described.

Figure 6:
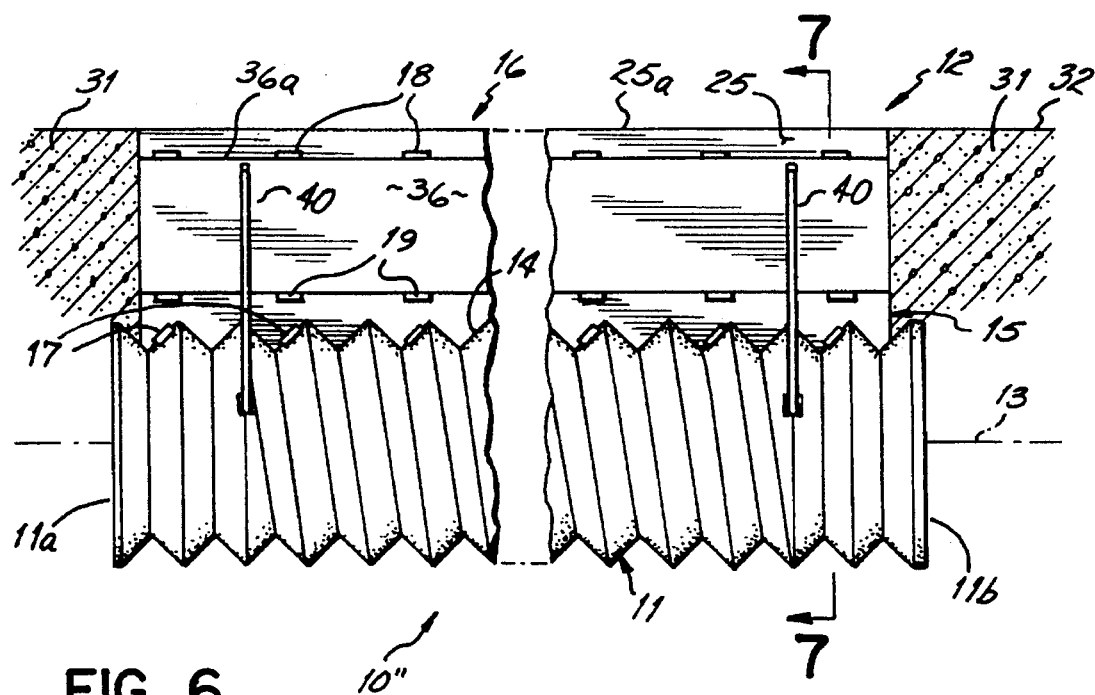
FIG. 6 is a side elevational view of of the second embodiment similar to the view of FIG. 3 but showing level grate structure; and, FIG. 7 is a cross sectional view of FIG. 6 taken along line 7—7.

As shown in FIG. 6, axis 13 and upper edges 24a, 25a are level with upper drain area or surface 32 after slotted drain pipe 10" has been installed underground and surrounded by fill material 31. This alternative is advantageous in an application in which drain pipe 11 is to be installed underground at a level or horizontal orientation or where the pitch of drain pipe 11 may be made to match the slope of drain surface 32. Preferably, upper edges of lower grate assembly 15, intermediate bearing plates 35, 36 and upper grate assembly 16 are all at least substantially parallel with axis 13 and drainage surface 32 in this situation.

Figure 7:
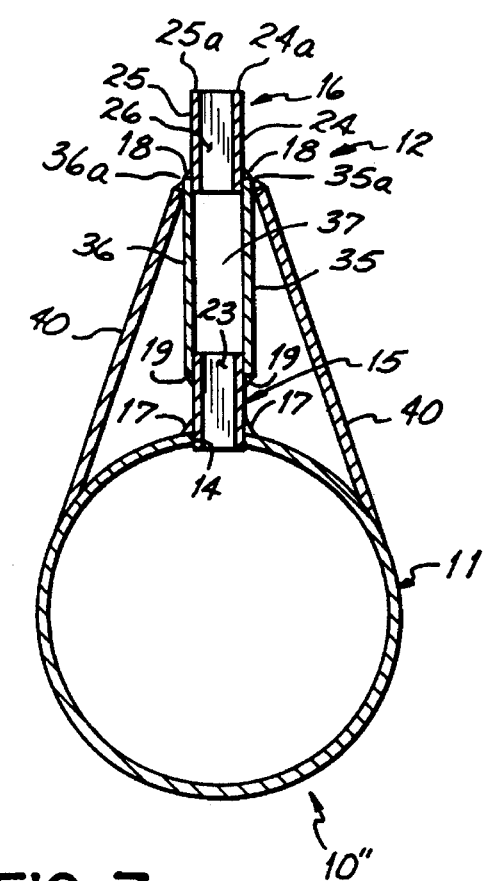

The second difference between FIGS. 3 and 5 and FIGS. 6 and 7 relates to the illustration of a plurality of reinforcement bars 40 welded between pipe 11 and grate assembly 12. Bars 40 are rigidly secured on both sides of grate assembly 12 as shown in FIG. 7. Bars 40 are primarily used for supporting a tall grate assembly 12 during any transportation thereof. After installation, fill material 31 will supply adequate support on both sides of grate assembly 12.

Certain modifications will become readily apparent to those of ordinary skill in the art without departing from the scope of the invention. For example, in the first embodiment of the invention, the lower grate 15 may be formed with a reduced height as is the lower grate 15 of the second embodiment while the upper grate 16 of the first embodiment may be made of an increased height and increased width such that a space is formed at the lower end thereof to allow vertical and angular adjustment thereof with respect to the lower grate 15 and the longitudinal axis 13 of the drain pipe 11. Stated in simpler terms, the upper and lower grate means of the invention may be telescopically or otherwise connected in a variety of different ways to achieve the same result of the present invention, that is, simultaneous adjustment of the vertical height and angle of the upper grate means with respect to the longitudinal axis of the drain pipe followed by rigid fixation to the lower grate means.

Also, while preferred forms and shapes for the upper and lower grate means are shown and described herein, it will be appreciated that each of these grate means may take many other shapes and forms. As one exemplary substitute shape, grates having trapezoidal cross-sectional shapes, i.e., grates having bearing plates sloped inwardly toward each other in an upward direction, may be substituted for the upper grate means of the present invention which is shown in a preferred form to have parallel bearing plates.

Furthermore, while the lower grate means of the present invention has been shown and described in the preferred embodiments as a typical grate, other suitably constructed frame members may form the lower grate means. Such frame members need only allow the upper grate means to be adjustably attached thereto in a manner allowing vertical and angular adjustment and, in addition, allow drainage to pass therethrough into the drain pipe.

Thus, while preferred embodiments of the present invention have been described above, various other modifications will become readily apparent to those of ordinary skill without departing from the scope of the invention and applicant intends to be bound only by the claims appended hereto.

I claim:

1. A method of adjusting the height and slope of a slotted drain upper grate structure and affixing said upper grate structure to a slotted drain wherein said slotted drain comprises a drain pipe to be placed in a trench at a predetermined depth, said drain pipe further having a longitudinal axis and an elongated slot extending lengthwise along a top surface thereof and said slotted drain further including a lower grate structure rigidly secured to said elongated slot for directing drainage into said drain pipe, said upper and lower grate structures each comprised of a pair of spaced bearing plates rigidly secured to one another by a plurality of spacer members extending therebetween, the method comprising the steps of:

rigidly connecting a pair of intermediate bearing plates to said lower bearing plates;

telescopically connecting said upper grate structure to said pair of intermediate bearing plates for directing drainage into said lower grate structure;

adjusting the height of said upper grate structure by moving said upper grate structure as a single unit with respect to said drain pipe to a predetermined height above and spaced from said lower grate structure;

adjusting the angle of said upper grate structure by angling said upper grate structure as a single unit with respect to the longitudinal axis of said drain pipe until upper edges of said upper grate structure are at least substantially parallel to said longitudinal axis; and, rigidly securing said upper grate structure to said pair of intermediate bearing plates with said upper grate structure spaced from said lower grate structure and with upper edges of said upper grate structure at least substantially parallel to said longitudinal axis.

2. The method of claim 1 wherein said step of rigidly connecting said pair of intermediate bearing plates to said pair of lower bearing plates further comprises welding each intermediate bearing plate to a respective lower bearing plate and said step of rigidly securing said upper bearing plates to said pair of intermediate bearing plates further comprises welding each intermediate bearing plate to a respective upper bearing plate.

3. A slotted drain comprising:

a drain pipe having a longitudinal axis and an elongated slot extending lengthwise along an upper surface thereof;

a lower grate structure rigidly secured to said elongated slot for directing drainage into said drain pipe, said lower grate structure including spaced lower bearing plates rigidly secured to one another by a plurality of lower spacer members extending therebetween;

an intermediate bearing plate rigidly secured to each respective lower bearing plate and extending upwardly therefrom;

an upper grate structure for directing drainage from a drain area into said lower grate means, said upper grate structure including spaced upper bearing plates rigidly secured to one another by a plurality of upper spacer members rigidly secured therebetween to form an integral structure from said upper bearing plates and said upper spacer members;

wherein side wall face portions of said intermediate bearing plates oppose side wall face portions of the bearing plates of at least one of said upper and lower grate structures, and wherein said upper grate structure, intermediate bearing plates and lower grate structure are rigidly secured to one another such that said upper grate structure is spaced from said lower grate structure and upper longitudinal edges of said upper bearing plates are at least substantially parallel to the longitudinal axis of said drain pipe.

4. A method of manufacturing a slotted drain comprising a drain pipe having a longitudinal axis and a grate assembly, the method comprising the steps of:

forming an elongated slot lengthwise along a top surface of said drain pipe, rigidly securing a lower grate comprising a pair of spaced lower bearing plates rigidly secured to each other by a plurality of spacer members to said elongated slot, rigidly securing an intermediate bearing plate to each of said lower bearing plates such that each intermediate bearing plate extends upwardly from a respective lower bearing plate, telescopically connecting an upper grate to said intermediate bearing plates such that said upper grate is adjustable with respect to said drain pipe, adjusting the height and angle of said upper grate with respect to said drain pipe to a predetermined height spaced above said lower grate and such that upper edges of said upper grate are at a substantially parallel orientation with respect to said longitudinal axis, and rigidly securing said upper grate to said intermediate bearing plates at said predetermined height and said substantially parallel orientation.

5. The method of claim 4 wherein the step of rigidly securing said upper grate to said intermediate bearing plates includes welding along upper edges of said intermediate bearing plates and along adjacent side wall surfaces of a pair of upper bearing plates which comprise said upper grate.

6. The method of claim 5 wherein each of said upper and lower bearing plates comprise flat plates and the steps of respectively rigidly securing said intermediate bearing plates to said lower bearing plates and rigidly securing said upper bearing plates comprise welding said intermediate bearing plates against respective outer side wall face portions of said upper and lower bearing plates.

* * * * *